(12) United States Patent (10) Patent No.: US 8,607,510 B2
Daniels (45) Date of Patent: Dec. 17, 2013

(54) FORM-FITTING SOLAR PANEL FOR ROOFS AND ROOF VENTS

(76) Inventor: Gregory S. Daniels, Rohnert Park, CA (US)

( * ) Notice: Subject to any disclaimer, the term of this patent is extended or adjusted under 35 U.S.C. 154(b) by 247 days.

(21) Appl. No.: 11/923,456

(22) Filed: Oct. 24, 2007

(65) Prior Publication Data

US 2008/0098672 A1 May 1, 2008

Related U.S. Application Data

(60) Provisional application No. 60/854,647, filed on Oct. 25, 2006.

(51) Int. Cl.
*E04D 13/18* (2006.01)

(52) U.S. Cl.
USPC .................. 52/173.3; 126/622; 136/245

(58) Field of Classification Search
USPC .......... 52/173.3, 198, 302.1, 748.1, 460, 461, 52/462; 126/622, 621, 623; 136/245, 251, 136/244, 206, 232
See application file for complete search history.

(56) References Cited

U.S. PATENT DOCUMENTS

| | | | |
|---|---|---|---|
| 3,376,164 A * | 4/1968 | Bachwansky | 136/251 |
| 3,459,597 A * | 8/1969 | Baron | 136/244 |
| 3,553,030 A * | 1/1971 | Lebrun | 36/244 |
| 3,658,596 A * | 4/1972 | Osborne | 136/251 |
| 3,769,091 A * | 10/1973 | Leinkram et al. | 136/246 |
| 3,888,697 A * | 6/1975 | Bogus et al. | 136/260 |
| 4,040,867 A * | 8/1977 | Forestieri et al. | 136/244 |
| 4,083,097 A * | 4/1978 | Anagnostou et al. | 438/67 |
| 4,097,308 A * | 6/1978 | Klein et al. | 136/251 |
| 4,189,881 A * | 2/1980 | Hawley | 52/91.3 |

(Continued)

FOREIGN PATENT DOCUMENTS

| | | |
|---|---|---|
| DE | 198 23 356 A1 | 11/1999 |
| JP | 11044035 A | 2/1999 |
| JP | 11-229576 | 8/1999 |
| JP | 02000274032 A | 10/2000 |

OTHER PUBLICATIONS

United Solar Ovonic, Solar Laminate PVL Series Model PVL-68, Uni-Solar, 2007.

(Continued)

*Primary Examiner* — William Gilbert
*Assistant Examiner* — James Ference
(74) *Attorney, Agent, or Firm* — Knobbe Martens Olson & Bear LLP

(57) ABSTRACT

A roof of a building is provided. The roof comprises a roof frame, a layer of curved roof cover elements (e.g., tiles) above the roof frame, and a solar panel secured to one or more of the roof cover elements. The solar panel substantially conforms to one or more curved surfaces of the one or more roof cover elements. Another aspect provides a roof comprising a roof frame, a layer of curved roof cover elements (e.g., tiles) above the roof frame, a vent member within the roof cover element layer, and a solar panel. The vent member has a curved surface and is sized and shaped to mimic the appearance of one or more of the roof cover elements. The vent member also has an opening allowing a ventilation airflow from the building interior toward an airspace above the vent member and the roof cover element layer. The solar panel is secured to and substantially conforms to the curved surface of the vent member.

10 Claims, 6 Drawing Sheets

(56) References Cited

U.S. PATENT DOCUMENTS

| | | | |
|---|---|---|---|
| 4,224,081 A * | 9/1980 | Kawamura et al. | 136/251 |
| 4,239,555 A * | 12/1980 | Scharlack et al. | 136/251 |
| 4,314,548 A | 2/1982 | Hanson | |
| 4,383,129 A * | 5/1983 | Gupta et al. | 136/251 |
| 4,404,958 A * | 9/1983 | Boettcher | 126/625 |
| 4,433,200 A * | 2/1984 | Jester et al. | 136/251 |
| 4,485,264 A * | 11/1984 | Izu et al. | 136/244 |
| 4,574,160 A * | 3/1986 | Cull et al. | 136/245 |
| D285,829 S * | 9/1986 | Lock | D13/102 |
| 4,625,469 A | 12/1986 | Gentry et al. | |
| 4,692,557 A * | 9/1987 | Samuelson et al. | 136/251 |
| 4,759,272 A | 7/1988 | Zaniewski | |
| 4,843,794 A | 7/1989 | Holtgreve | |
| 4,850,166 A | 7/1989 | Taylor | |
| 4,860,509 A * | 8/1989 | Laaly et al. | 52/173.3 |
| 4,965,971 A | 10/1990 | Jean-Jacques et al. | |
| 5,048,255 A * | 9/1991 | Gonzales | 52/533 |
| 5,060,444 A * | 10/1991 | Paquette | 52/535 |
| 5,078,047 A | 1/1992 | Wimberly | |
| 5,092,939 A | 3/1992 | Nath et al. | |
| 5,094,697 A * | 3/1992 | Takabayashi et al. | 136/249 |
| 5,131,200 A * | 7/1992 | McKinnon | 52/536 |
| 5,131,888 A * | 7/1992 | Adkins, II | 454/343 |
| 5,133,810 A * | 7/1992 | Morizane et al. | 136/251 |
| 5,176,758 A | 1/1993 | Nath et al. | |
| 5,228,925 A * | 7/1993 | Nath et al. | 136/251 |
| 5,232,518 A * | 8/1993 | Nath et al. | 136/251 |
| 5,238,519 A * | 8/1993 | Nath et al. | 156/382 |
| 5,273,608 A | 12/1993 | Nath | |
| 5,296,043 A * | 3/1994 | Kawakami et al. | 136/244 |
| 5,316,592 A | 5/1994 | Dinwoodie | |
| 5,385,848 A * | 1/1995 | Grimmer | 438/62 |
| 5,391,235 A * | 2/1995 | Inoue | 136/244 |
| 5,409,549 A * | 4/1995 | Mori | 136/244 |
| 5,419,781 A * | 5/1995 | Hamakawa et al. | 136/244 |
| 5,437,735 A * | 8/1995 | Younan et al. | 136/251 |
| 5,480,494 A * | 1/1996 | Inoue | 136/251 |
| 5,486,238 A * | 1/1996 | Nakagawa et al. | 136/259 |
| 5,505,788 A | 4/1996 | Dinwoodie | |
| 5,575,861 A * | 11/1996 | Younan et al. | 136/251 |
| 5,602,457 A * | 2/1997 | Anderson et al. | 320/102 |
| 5,651,226 A * | 7/1997 | Archibald | 52/518 |
| 5,697,192 A * | 12/1997 | Inoue | 52/173.3 |
| 5,706,617 A * | 1/1998 | Hirai et al. | 52/173.3 |
| 5,746,839 A | 5/1998 | Dinwoodie | |
| 5,800,631 A * | 9/1998 | Yamada et al. | 136/251 |
| 5,968,287 A | 10/1999 | Nath | |
| 5,990,414 A * | 11/1999 | Posnansky | 136/244 |
| 6,008,450 A * | 12/1999 | Ohtsuka et al. | 136/251 |
| 6,050,039 A | 4/2000 | O'Hagin | |
| 6,051,774 A * | 4/2000 | Yoshida et al. | 136/244 |
| 6,061,977 A * | 5/2000 | Toyama et al. | 52/173.3 |
| 6,105,317 A | 8/2000 | Tomiuchi et al. | |
| 6,129,628 A | 10/2000 | O'Hagin et al. | |
| 6,155,006 A * | 12/2000 | Mimura et al. | 52/173.3 |
| 6,242,685 B1 * | 6/2001 | Mizukami et al. | 136/244 |
| 6,294,724 B1 * | 9/2001 | Sasaoka et al. | 136/251 |
| 6,311,436 B1 * | 11/2001 | Mimura et al. | 52/173.3 |
| 6,336,304 B1 * | 1/2002 | Mimura et al. | 52/748.1 |
| 6,340,403 B1 * | 1/2002 | Carey et al. | 156/182 |
| 6,365,824 B1 * | 4/2002 | Nakazima et al. | 136/251 |
| 6,380,477 B1 * | 4/2002 | Curtin | 136/244 |
| D458,391 S * | 6/2002 | O'Hagin et al. | D25/140 |
| D458,392 S * | 6/2002 | O'Hagin et al. | D25/143 |
| 6,453,629 B1 * | 9/2002 | Nakazima et al. | 52/173.3 |
| 6,459,032 B1 * | 10/2002 | Luch | 136/244 |
| 6,501,013 B1 * | 12/2002 | Dinwoodie | 136/251 |
| 6,541,693 B2 * | 4/2003 | Takada et al. | 136/244 |
| 6,553,729 B1 * | 4/2003 | Nath et al. | 52/173.3 |
| 6,606,830 B2 * | 8/2003 | Nagao et al. | 52/173.3 |
| D479,885 S * | 9/2003 | O'Hagin et al. | D25/143 |
| 6,729,081 B2 * | 5/2004 | Nath et al. | 52/173.3 |
| 6,730,841 B2 | 5/2004 | Heckeroth | |
| 6,767,762 B2 | 7/2004 | Guha | |
| 6,799,742 B2 * | 10/2004 | Nakamura et al. | 244/172.7 |
| 6,870,087 B1 * | 3/2005 | Gallagher | 136/246 |
| 6,875,914 B2 * | 4/2005 | Guha et al. | 136/251 |
| 6,928,775 B2 * | 8/2005 | Banister | 52/173.3 |
| 7,053,294 B2 * | 5/2006 | Tuttle et al. | 136/265 |
| 7,101,279 B2 | 9/2006 | O'Hagin et al. | |
| 7,176,543 B2 | 2/2007 | Beernink | |
| 7,178,295 B2 * | 2/2007 | Dinwoodie | 52/173.3 |
| 7,320,774 B2 * | 1/2008 | Simmons et al. | 264/333 |
| 7,365,266 B2 | 4/2008 | Heckeroth | |
| 7,469,508 B2 * | 12/2008 | Ceria | 52/173.3 |
| 7,506,477 B2 | 3/2009 | Flaherty et al. | |
| 7,509,775 B2 | 3/2009 | Flaherty et al. | |
| 7,517,465 B2 | 4/2009 | Guha et al. | |
| 7,531,740 B2 | 5/2009 | Flaherty et al. | |
| 7,578,102 B2 * | 8/2009 | Banister | 52/173.3 |
| 7,587,864 B2 * | 9/2009 | McCaskill et al. | 52/173.3 |
| 7,642,449 B2 * | 1/2010 | Korman et al. | 136/244 |
| 7,678,990 B2 * | 3/2010 | McCaskill et al. | 136/244 |
| 7,736,940 B2 * | 6/2010 | Basol | 438/95 |
| 2001/0027804 A1 * | 10/2001 | Inoue et al. | 136/256 |
| 2002/0104562 A1 * | 8/2002 | Emoto et al. | 136/261 |
| 2004/0031219 A1 * | 2/2004 | Banister | 52/220.2 |
| 2005/0074915 A1 * | 4/2005 | Tuttle et al. | 438/57 |
| 2005/0127379 A1 | 6/2005 | Nakata | 257/84 |
| 2005/0176270 A1 * | 8/2005 | Luch | 439/67 |
| 2005/0178429 A1 * | 8/2005 | McCaskill et al. | 136/251 |
| 2005/0239394 A1 | 10/2005 | O'Hagin et al. | |
| 2005/0263178 A1 * | 12/2005 | Montello et al. | 136/244 |
| 2005/0263179 A1 * | 12/2005 | Gaudiana et al. | 136/244 |
| 2005/0263180 A1 * | 12/2005 | Montello et al. | 136/244 |
| 2005/0274408 A1 * | 12/2005 | Li et al. | 136/244 |
| 2006/0017154 A1 * | 1/2006 | Eguchi et al. | 257/701 |
| 2006/0032527 A1 * | 2/2006 | Stevens et al. | 136/251 |
| 2006/0086384 A1 * | 4/2006 | Nakata | 136/250 |
| 2007/0084501 A1 * | 4/2007 | Kalberlah et al. | 136/245 |
| 2007/0207725 A1 | 9/2007 | O'Hagin | |
| 2009/0203308 A1 | 8/2009 | O'Hagin et al. | |
| 2010/0229940 A1 * | 9/2010 | Basol | 136/256 |

OTHER PUBLICATIONS

U.S. Appl. No. 12/428,346, filed Apr. 22, 2009, now published as US 2009/203308 A1.

U.S. App. No. 12/918,799, filed Aug. 20, 2010, now published as US 2010/0330898 A1.

* cited by examiner

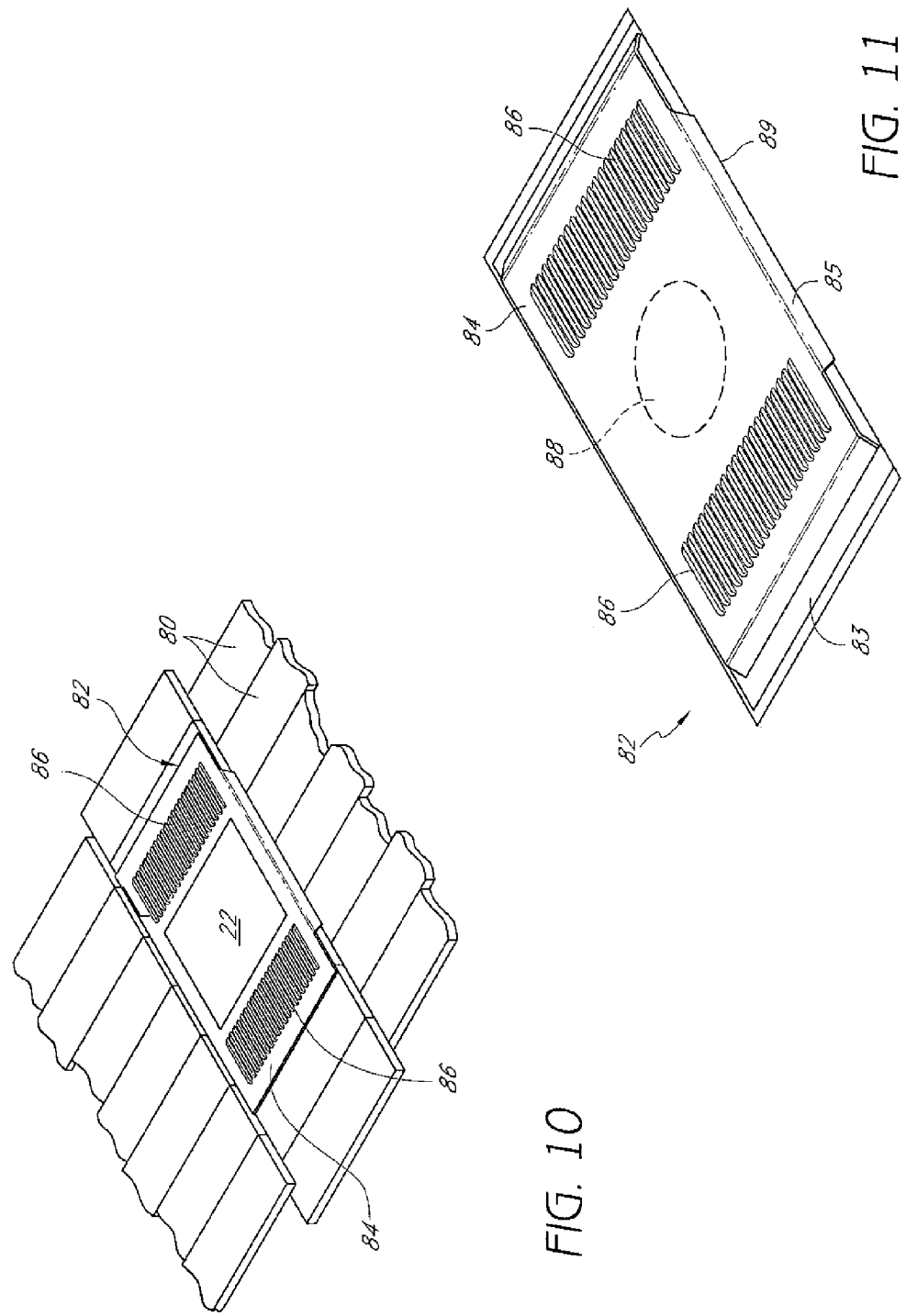

FORM-FITTING SOLAR PANEL FOR ROOFS AND ROOF VENTS

CLAIM FOR PRIORITY

This application claims the priority benefit under 35 U.S.C. §119(e) of Provisional Application Ser. No. 60/854,647, filed Oct. 25, 2006. The full disclosure of this priority application is incorporated herein by reference.

CROSS-REFERENCE TO RELATED APPLICATIONS

The present application incorporates by reference the entire disclosures of (1) U.S. Pat. No. 6,050,039; (2) U.S. Pat. No. 6,129,628; (3) U.S. Patent Application Publication No. 2005-0239394-A1; and (4) U.S. Provisional Application No. 60/793,337, filed Apr. 18, 2006, entitled "Automatic Roof Ventilation System."

BACKGROUND OF THE INVENTION

1. Field of the Invention

The present invention relates generally to roofs for buildings, and specifically to integration of solar panels into roofs.

2. Description of the Related Art

For decades, builders and solar power companies have installed solar panels onto the roofs of buildings. The solar panels absorb solar radiation that can be stored in a solar cell, advantageously providing a free source of power for the building. Such solar panels are generally rigid and flat in shape. As such, the solar panels visibly stand out from the remainder of the roof.

In some applications, the solar panels are used on roofs and roof vents specifically to power certain devices. For example, U.S. Patent Application Publication No. 2005-0239394-A1 discloses a tile vent with an integrated solar panel that powers an electric fan mounted below the vent, the fan acting to assist ventilation airflow. Another example is U.S. Provisional Application No. 60/795,905, filed Apr. 27, 2006, entitled "Automated Roof Vent," which discloses a roof vent with a flat planar vent door having an open position allowing ventilation through the roof, and a closed position substantially restricting ventilation through an opening of the roof vent. The roof vent also includes a motor that controls the position of the vent door, an electric controller that controls the motor, a battery that powers the controller and the motor, and a solar panel secured to a flat surface of the vent door, the solar panel delivering power to the battery.

SUMMARY OF THE INVENTION

One problem with conventional roofs having solar panels is that the solar panels tend to be bulky and do not blend in with the roof covering. For example, the roof covering may comprise shingles (made of various materials, e.g., steel, composition, wood), or tiles (made of metal, clay, concrete, plastic, or other materials) of any of a variety of different shapes and sizes. The solar panels thus tend to stand out visibly and reduce the attractiveness of the roof.

In one aspect, a roof of a building is provided. The roof comprises a roof frame, a layer of curved roof cover elements (e.g., tiles) above the roof frame, and a solar panel secured to one or more of the roof cover elements. The solar panel substantially conforms to one or more curved surfaces of the one or more roof cover elements.

Another aspect provides a roof cover element (e.g., a tile) comprising a body having a curved surface, and a solar panel secured to and substantially conforming to the curved surface.

In another aspect, a roof of a building is provided. The roof comprises a roof frame, a roof deck supported on the roof frame, a layer of curved roof cover elements (e.g., tiles) above the roof deck, a vent, and a solar panel. The vent comprises a primary vent member secured to the roof deck, and a secondary vent member located within the roof cover element layer. The primary vent member has an opening in fluid communication with an aperture in the roof deck. The opening allows a ventilation airflow between an interior of the building (e.g., an attic) and an area above the primary vent member. The secondary vent member has a curved surface and is sized and shaped to mimic the appearance of one or more of the roof cover elements. The secondary vent member is positioned above the primary vent member to prevent ingress of water through the opening while allowing the ventilation airflow to travel from the building interior through the aperture and the opening toward an airspace above the secondary vent member. The solar panel is secured to and substantially conforms to the curved surface of the secondary vent member.

In another aspect, a roof of a building is provided. The roof comprises a roof frame, a layer of curved roof cover elements (e.g., tiles) above the roof frame, a vent member within the roof cover element layer, and a solar panel. The vent member has a curved surface and is sized and shaped to mimic the appearance of one or more of the roof cover elements. The vent member also has an opening allowing a ventilation airflow from an interior of the building to an airspace above the vent member and the roof cover element layer. The solar panel is secured to and substantially conforms to the curved surface of the vent member.

In yet another aspect, a method comprises providing a roof cover element (e.g., a tile), and attaching a flexible, form-fitting solar panel to the roof cover element. In one embodiment, providing a roof cover element comprises providing a roof tile with a curved surface, and attaching the solar panel to the roof cover element comprises substantially conforming the solar panel to the curved surface.

In still another embodiment, a method comprises providing a roof vent member, and attaching a flexible, form-fitting solar panel to the roof vent member. In one embodiment, providing a roof vent member comprises providing a vent member with a curved surface, and attaching the solar panel to the vent member comprises substantially conforming the solar panel to the curved surface.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to

BRIEF DESCRIPTION OF THE DRAWINGS

FIG. 10 is a perspective view of a tile roof comprising flat tiles and having a flat tile vent with a form-fitting solar panel attached thereto.

FIG. 11 is a perspective view of the flat tile vent of FIG. 10.

DETAILED DESCRIPTION OF THE PREFERRED EMBODIMENT

Figure 1:
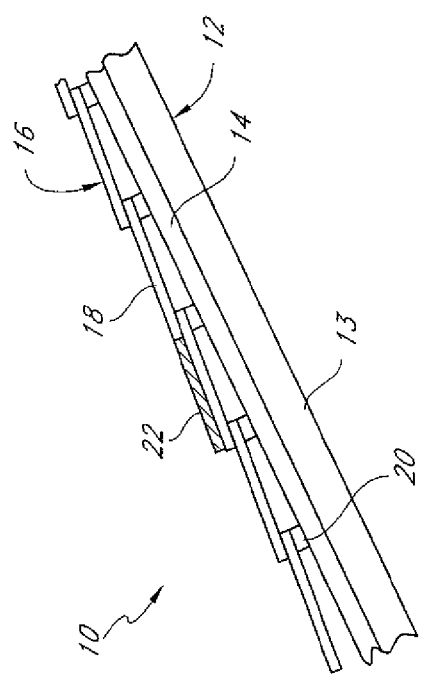
FIG. 1 is a cross-sectional side view of a portion of a tile roof with a form-fitting solar panel secured to one of the tiles.

FIG. 1 shows an exemplary tile roof 10 comprising a roof frame 12, a roof deck 14 supported on the roof frame 12, and a layer 16 of roof cover elements. In this embodiment, the roof cover element layer 16 comprises a layer of tiles 18. However, the roof cover elements may alternatively comprise other elements, such as shingles (e.g., made of steel, metal, composition material, wood, or other materials). The tiles 18 may be formed of, e.g., metal, clay, concrete, plastic, or other materials. The roof frame 12 may comprise rafters 13 that extend from an upper ridge (not shown) of the roof to a lower eave (not shown). The roof frame 12 may also comprise purlins (not shown) that extend substantially parallel to the ridge and eave and substantially perpendicular to the rafters 13. The roof deck 14 typically comprises plywood, metal, or some type of alloy (e.g., steel) sheeting. The roof cover element layer 16 typically comprises a plurality of tiles 18 supported on battens 20 oriented substantially parallel to the ridge and eave (and substantially perpendicular to the rafters 13). In the illustrated roof 10, each batten 20 directly supports an upper edge of a tile 18, which in turn supports a lower edge of an immediately adjacent tile 18. In this arrangement, water tends to flow over each tile's lower edge onto another tile 18. The illustrated tiles 18 are flat tiles, as known in the art. Alternative tile shapes are also possible, including so-called "S-shaped" or "M-shaped" tiles, which are described below, and many other tile shapes.

The illustrated roof 10 includes a solar panel 22 secured to one of the tiles 18. The solar panel 22 is preferably flexible and configured to substantially conform to a flat or curved surface of one or more of the tiles 18. The roof 10 can include any number of solar panels 22. The solar panels 22 can be used to power a variety of different types of devices, such as ventilation fans, motorized vent doors, and the like. The solar panels 22 can alternatively or additionally be used simply to collect power (in the form of solar energy) that can be stored in a battery for later use. In some municipalities, the solar panels 22 can even deliver energy into the community's electrical grid, often in exchange for reduced electrical bills.

Figure 2:
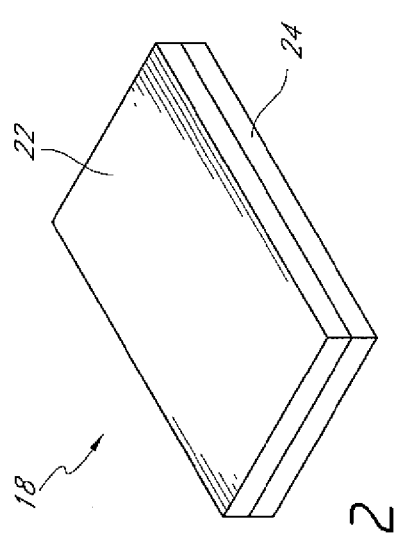
FIG. 2 is a perspective view of a flat tile with a form-fitting solar panel attached thereto.
Figure 4:
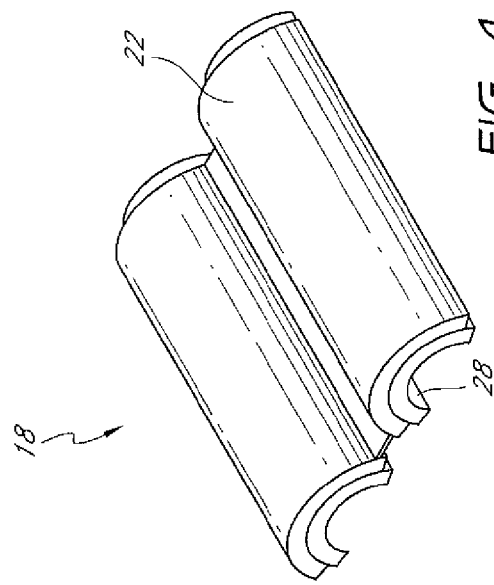
FIG. 4 is a perspective view of an M-shaped tile with a form-fitting solar panel attached thereto.
Figure 3A:
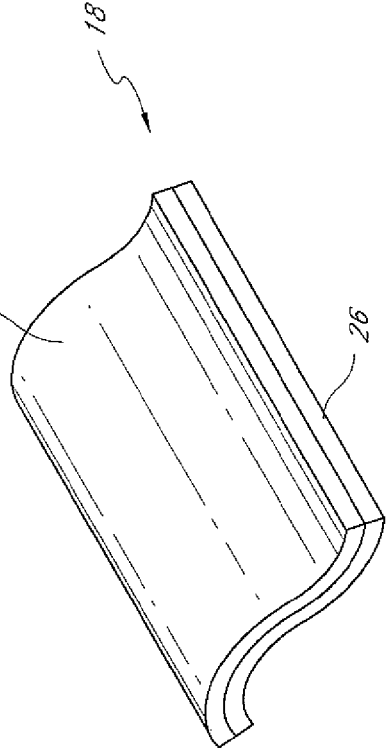
FIG. 3A is a perspective view of an S-shaped tile with a form-fitting solar panel attached thereto.

As mentioned, the roof tiles 18 can comprise flat tiles, S-shaped tiles, M-shaped tiles, or other shapes. As used herein, the terms "flat tile," "S-shaped tile," and "M-shaped tile" are to be construed as having their understood meanings within the roofing industry. FIG. 2 is a perspective view of a roof tile 18 having a generally flat tile body 24 and a solar panel 22. The solar panel 22 is secured to and substantially conforms to a flat surface of the tile body 24. FIG. 3 is a perspective view of an S-shaped roof tile 18 having a generally curved tile body 26 and a solar panel 22. The solar panel 22 is secured to and substantially conforms to a curved surface of the tile body 26. FIG. 4 is a perspective view of an M-shaped roof tile 18 having a generally curved tile body 28 and a solar panel 22. The solar panel 22 is secured to and substantially conforms to a curved surface of the tile body 28. Skilled artisans will appreciate that the solar panel 22 can preferably be secured to and conform with a variety of different shapes of roof cover elements (including, without limitation, tiles and/or shingles). It will be understood that the roof cover elements may be formed of a variety of materials, such as, without limitation, wood shingles, composition shingles, metal shingles, steel shingles, metal (e.g., sheet metal) tiles, clay tiles, concrete tiles, plastic tiles, or other materials.

Figure 3B:
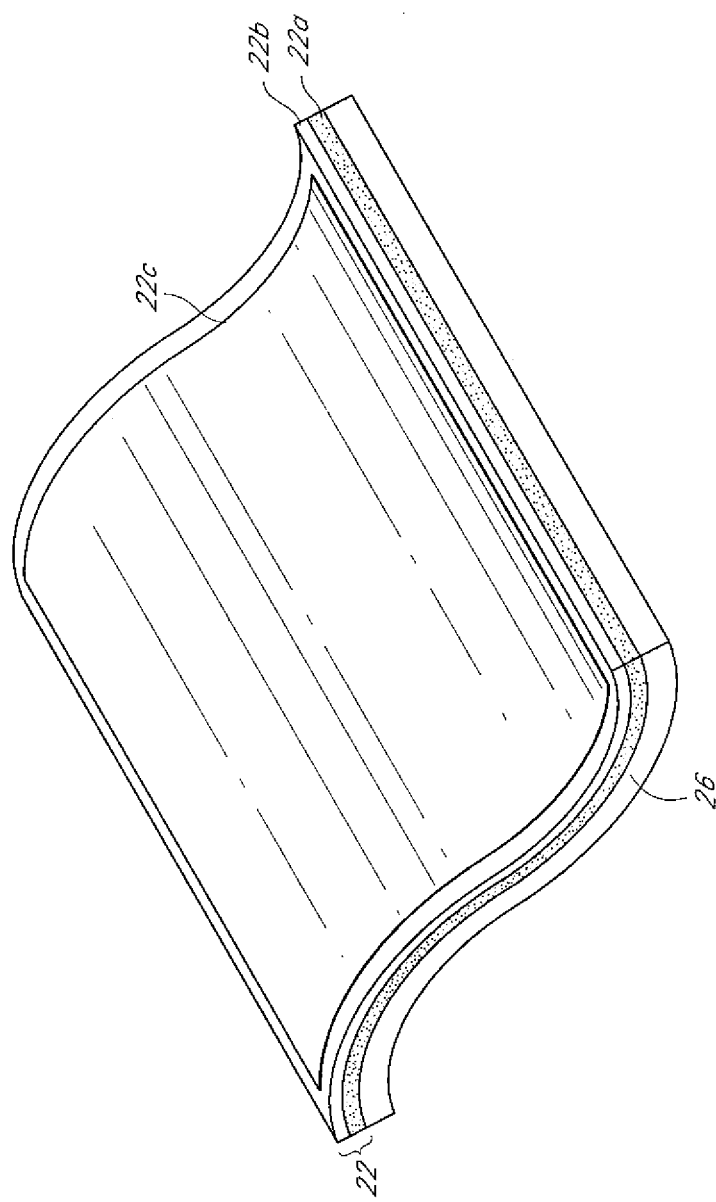
FIG. 3B is a perspective view of an S-shaped the with a form-fitting solar panel including a cushioned backing material, a flexible sheet, and a solar cell.

In one embodiment, the flexible, form-fitting solar panel 22 comprises a durable, lightweight, spectrum-splitting amorphous silicon cell design 22c on a flexible stainless steel sheet 22b, as shown in FIG. 3B. Vinyl and foam modules can be encapsulated in UV stabilized polymers and bonded and stitched to a cushioned backing material 22a. Suitable solar panels 22 are sold by United Solar Systems Corp. of Troy, Mich., under the trademark UNI-SOLAR.

Figure 5:
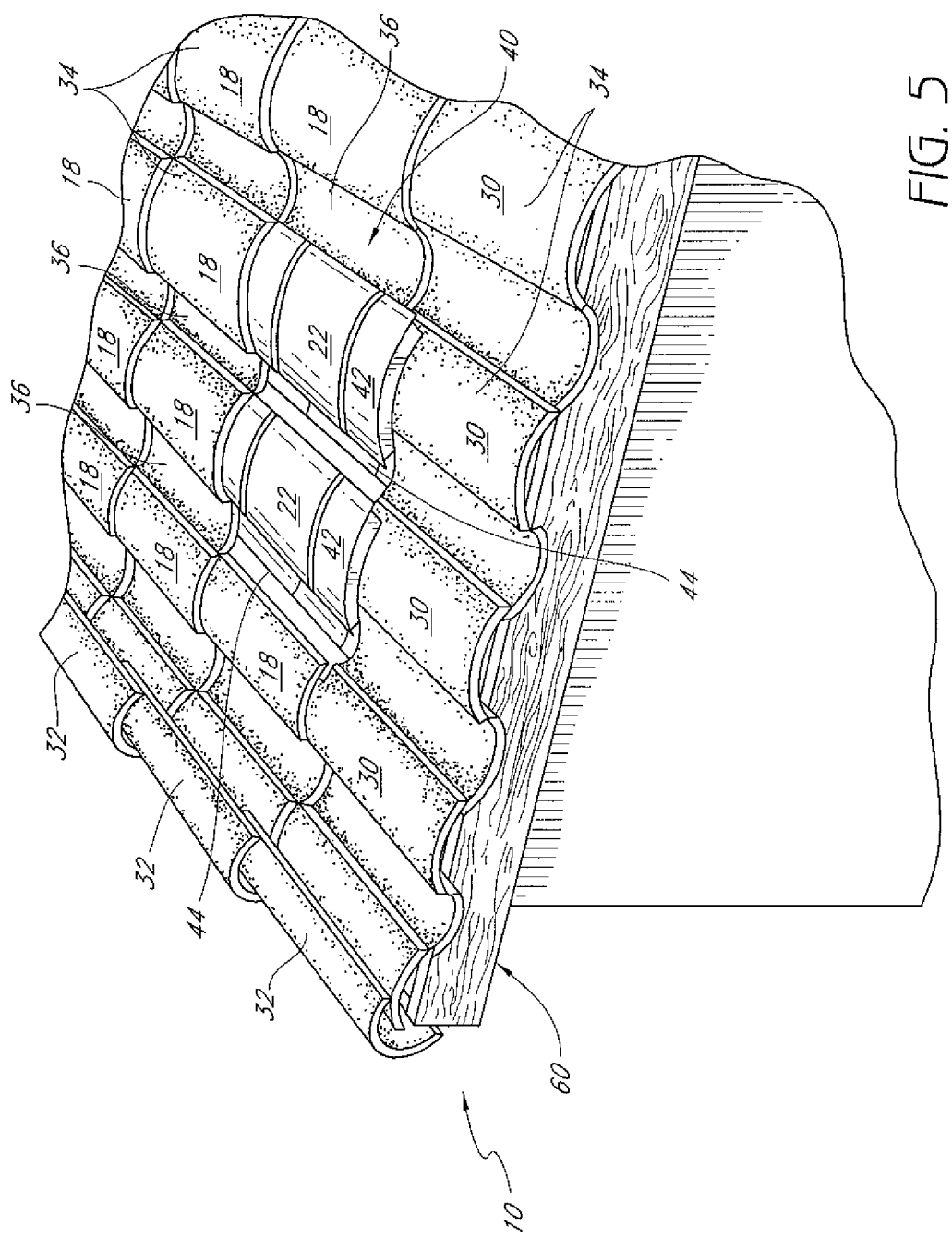
FIG. 5 is a perspective view of a tile roof comprising S-shaped tiles and having an S-shaped tile vent with a form-fitting solar panel attached thereto.

FIG. 5 is a perspective view of a section of a pitched tile roof 10 near an eave 60, in accordance with one embodiment of the invention. The roof 10 comprises S-shaped roof tiles 18. A row of edge tiles 30 are provided at the eave 60, and a column of edge caps 32 are provided on the side edges of the roof 10. Ridge caps (not shown) can be provided at the ridge (not shown). In this particular configuration, the tiles 18 and 30 each include a cap area 34 and a pan area 36. The cap areas 34 and pan areas 36 of vertically aligned tiles 18, 30 form cap columns and pan channels, respectively, such that the roof comprises alternating parallel cap columns and pan channels. Further details of the configuration of roof 10 of FIG. 5 are shown and described in U.S. Pat. No. 6,050,039.

The illustrated roof 10 of FIG. 5 includes a tile vent 40 preferably adapted to blend into the roof 10 and mimic the appearance of one or more of the roof tiles 18. In one embodiment, the tile vent 40 is preferably substantially as shown and described in U.S. Pat. No. 6,050,039. The vent 40 preferably includes one or more cap sections 42 and corresponding pan sections 44. As such, each cap section 42 and corresponding pan section 44 preferably mimics the appearance of one cap section 34 and pan section 36, respectively. In the illustrated embodiment, the tile vent 40 mimics the appearance of two roof tiles 18. However, skilled artisans will appreciate that the vent 40 can mimic the appearance of any desired number of roof tiles 18, including just one roof tile 18. In this document, roof cover elements (e.g., roof tiles) and roof vents (e.g., tile vents) may be collectively referred to as "roof members."

Affixed on the upper curved surfaces of the cap sections 42 are solar panels 22. Advantageously, the solar panels 22 are form-fitting and conform to the curved upper surfaces of the cap sections 42. Preferably, the solar panels 22 are adhered to the cap sections 42. However, skilled artisans will appreciate that there are other ways to affix the solar panels 22 to the tile vent 40. While only shown affixed to the cap sections 42 of the tile vent 40, the solar panels 22 can alternatively or additionally be affixed to and in conformity with the curved upper surfaces of the pan sections 44. Also, while two separate solar panels 22 are shown attached to the two cap sections 42, in some configurations it is possible to use a different number of solar panels, including just one solar panel for each vent 40. Preferably, electrical connections are provided for transferring solar energy absorbed by the solar panels 22 to a battery, municipal power grid, or other electrical devices. It will be appreciated that the roof 10 can include any suitable number of roof vents 40 with solar panels 22. In a preferred embodiment, roof vents are generally arranged near the ridge and eaves of the roof.

Figure 6:
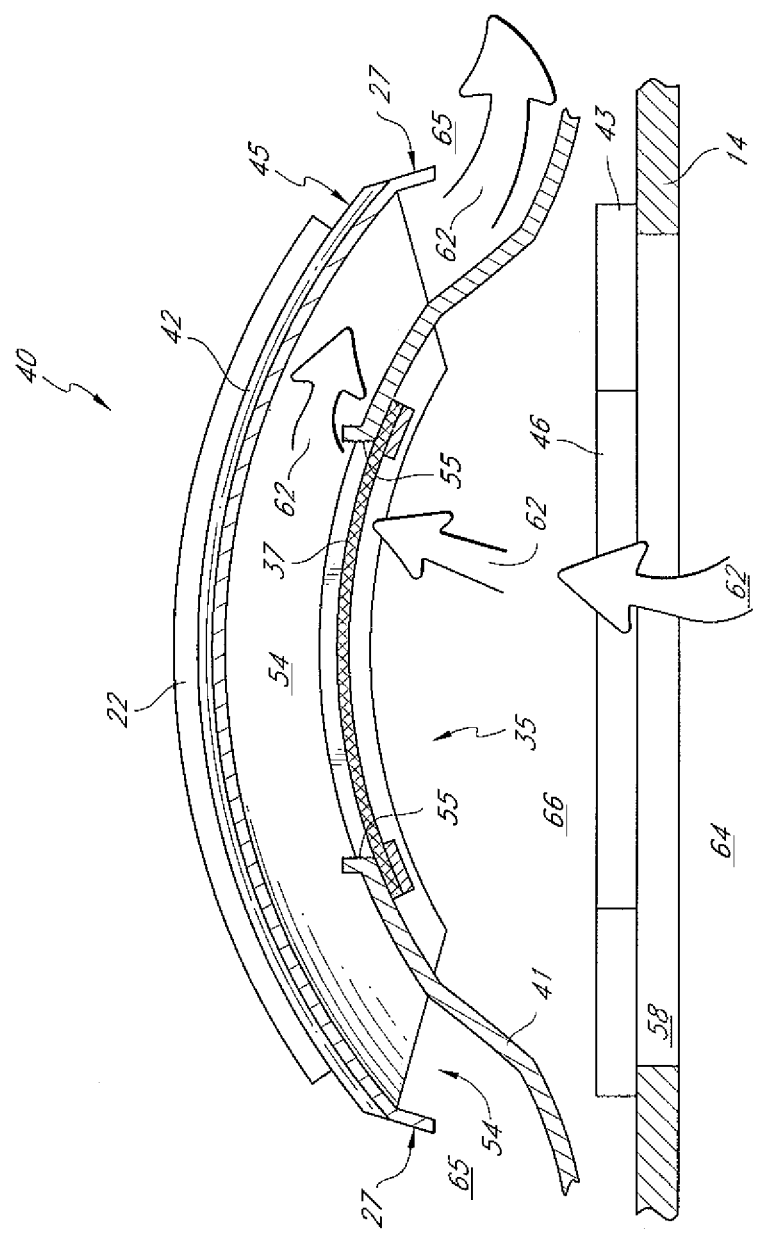
FIG. 6 is a cross-sectional view of a portion of the S-shaped tile vent of FIG. 5.

FIG. 6 is a cross-sectional view of a portion of one embodiment of a tile vent 40 with a form-fitting solar panel 22 attached thereto. The tile vent 40 is preferably substantially as shown and described in U.S. Pat. No. 6,050,039. The illustrated tile vent 40 comprises a primary vent member or "sub-flashing" 43, a secondary vent member 45 spaced above the primary vent member, and a flexible, form-fitting solar panel 22 secured to an upper curved surface of a cap member 42 of the secondary vent member 45. The primary vent member 43 is secured to the roof deck 14, over a roof deck aperture 58 thereof. The roof deck aperture 58 provides fluid communication between the attic 64 of the building and a space 66 (such as a batten cavity) above the roof deck 14. The primary vent member 43 includes a vent opening 46 (which may be screened) that fluidly communicates with the roof deck aperture 58.

The secondary vent member 45 is spaced generally above the primary vent member 43. In one embodiment, the secondary vent member 45 is secured to the primary vent member 43, for example by spacer elements (not shown). In this embodiment, the secondary vent member 45 can also be secured to adjacent surrounding tiles, such as to an upper or lower tile 18, 30 (e.g., with a storm clip). While such an embodiment ensures a desired physical relationship between the primary vent member 43 and the secondary vent member 45, it can also be problematic when the surrounding tiles (e.g., 18, 30, 32) are positioned inaccurately with respect to the secondary vent member 45. In general, a high degree of skill is required in the installation of the tiles and tile vent(s) for accurate positioning thereof. In an alternative embodiment, the secondary vent member 45 is secured to one or more adjacent tiles in the roof's field of tiles, without being secured to the primary vent member 43. For example, the secondary vent member 45 can be secured (e.g., by a storm clip) to a lower and/or upper adjacent tile of a pitched roof (i.e., a tile in an adjacent upper or lower row). This embodiment allows for greater flexibility in the positioning of the tiles relative to the primary vent member 43.

The illustrated secondary vent member 45 includes a "skeleton" 41 with a vent opening 35 generally above the vent opening 46. Preferably, the vent opening 35 is covered by a screen 37. Elongated upstanding baffles 55 can be provided to help prevent wind-driven rain from flowing down through the vent opening 35. The cap member 42 is preferably secured to the skeleton 41 so that a ventilation space 54 is formed therebetween, for example by using any of a wide variety of different types of spacer elements. The cap member 42 is preferably positioned above the vent opening 35 to substantially prevent the ingress of rain through the vent opening 35. Elongated side hems or downward baffles 27 can be provided to help prevent wind-driven rain from flowing down through the vent opening 37. In use, attic air 62 flows from the attic 64 through the roof deck aperture 58, vent opening 46, space or batten cavity 66, vent opening 35, and ventilation space 54 to the outside 65.

FIG. 6 shows a single cap section 42 above the opening 46 of the primary vent member 43. Thus, FIG. 6 is a simplification of the tile vent 40 of FIG. 5, which includes two cap sections 42 and two pan sections 44. Skilled artisans will understand that the tile vent 40 can have any number of cap sections and pan sections, and that all of such sections are preferably provided generally above one opening 46 of the primary vent member 43. Also, the secondary vent member 45 can replace any number of tiles in a field of tiles, including just one such tile.

Figure 7:
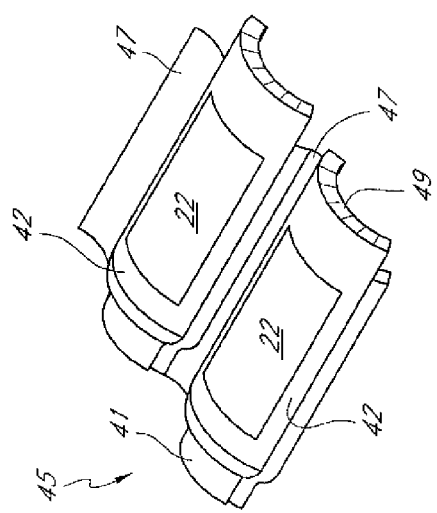
FIG. 7 is a perspective view of a secondary vent member and cap members of the S-shaped tile vent of FIG. 5.

FIG. 7 is a perspective view of the secondary vent member 45 of the roof vent 40 of FIGS. 5 and 6. In this embodiment, the skeleton 41 comprises two S-shaped portions, each of which has one attached cap member 42. The forward edges of the cap members 42 can have downwardly depending flanges 49, to help prevent the ingress of rain or snow through the vent 40. Two flexible, form-fitting solar panels 22 are provided, each being secured in conformity with a curved upper surface of one of the cap members 42. There are two pan sections 47, which are configured to align with the aforementioned pan areas 36 of the roof tiles 18, 30 (FIG. 5). Similarly, the cap members 42 are configured to align with the cap areas 34 of the roof tiles 18, 30. Thus, the roof vent 40 advantageously mimics the appearance of and substantially blends in with the roof tiles 18, 30 of the pitched tile roof 10. The solar panels 22 may have a different color than that of the tiles 18 and secondary vent member 45. For example, the solar panels 22 may be generally black. However, by conforming to the shape of the cap members 42, the solar panels 22 do not substantially affect or alter the profile of the tile vent 40.

Figure 8:
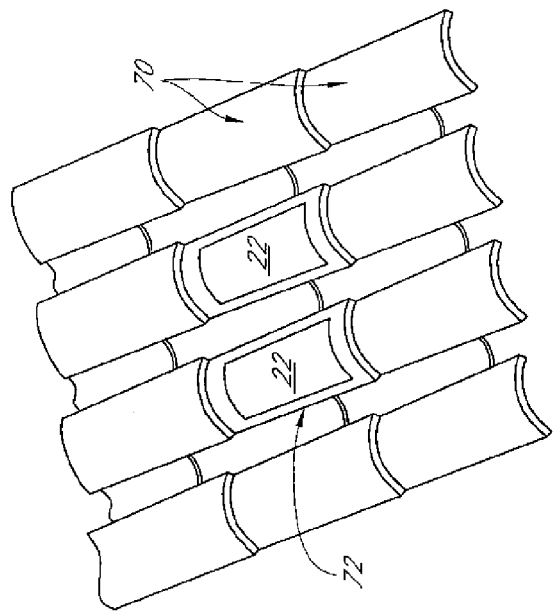
FIG. 8 is a perspective view of a portion of a tile roof comprising M-shaped tiles and having an M-shaped tile vent with form-fitting solar panels attached thereto.
Figure 9:
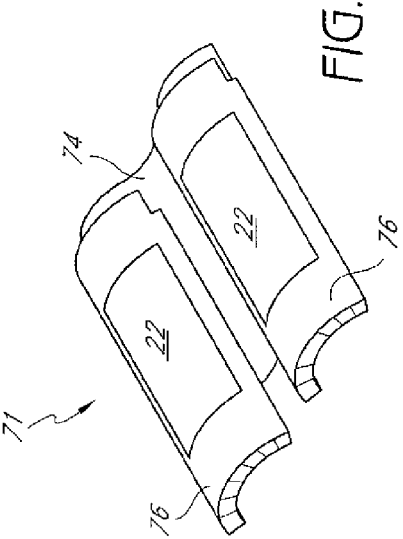
FIG. 9 is a perspective view of a secondary vent member and cap members of the M-shaped tile vent of FIG. 8.

FIG. 8 is a perspective view of a portion of a tile roof comprising M-shaped tiles 70 and having an M-shaped tile vent 72 with form-fitting solar panels 22 attached thereto. In a preferred embodiment, the M-shaped tile vent 72 is constructed substantially similarly to the above-described S-shaped tile vent 40 of FIGS. 5-7, the difference being that the vent 72 is sized, configured, and shaped to resemble one or more of the M-shaped tiles 70. The solar panels 22 are preferably each secured in conformity with a curved upper surface of the vent 72. FIG. 9 is a perspective view of a secondary vent member 71 of the M-shaped tile vent 72 of FIG. 8. In the illustrated embodiment, the solar panels 22 are secured in conformity with curved upper surfaces of cap members 76 secured to cap sections of a skeleton 74.

While the aforementioned solar panels 22 have been illustrated and described in the context of being attached to tile vents having curved surfaces, skilled artisans will understand that they can also be attached to flat surfaces of roof cover elements. For example, FIGS. 10 and 11 illustrate the use of the solar panels 22 on a substantially flat tile vent. FIG. 10 is a perspective view of a portion of a tile roof comprising flat tiles 80 and having a substantially flat tile vent 82 with a form-fitting solar panel 22 attached thereto. The flat tile vent 82 can replace one or more of the flat tiles 80. FIG. 11 is a perspective view of the tile vent 82. A variety of different types of flat tile vents can be employed. For example, the tile vent 82 may be substantially as shown and described in U.S. Pat. No. 6,129,628. Accordingly, the tile vent 82 can comprise a lower substantially flat base 83 and a substantially flat cover member 84. The base 83 has an opening 88 in fluid communication with an aperture (not shown) in the roof deck. Preferably, the cover member has one or more openings 86, such as louvers as shown. The cover member 84 is preferably opaque, such that the base opening 88 would not be visible in the view of FIG. 11. However, to better illustrate the vent 82, FIG. 11 shows the base opening 88 and not the solar panel 22. In use, attic air travels through the roof deck aperture, the base opening 88, and through the openings 86 and/or through a front opening 89 between the base 83 and a front edge or flange 85 of the cover member 84. The vent 82 is preferably configured to blend in with and mimic the appearance of the flat tiles 80.

While described and illustrated in the context of tile roofs, the flexible, form-fitting solar panels 22 can be applied to a variety of different types of roof coverings, including shingles and composition sheeting.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A roof member configured to form a portion of the top surface of a roof, the roof member comprising:
   a roof member body having a curved surface, wherein the body comprises a roof tile or shingle, the roof tile or shingle supported on one or more battens, the roof tile or shingle overlapping a portion of an adjacent roof tile or shingle; and
   a solar panel secured to and substantially conforming to the curved surface, wherein the solar panel comprises a cushioned-backing material adhered to the curved surface of the body, a flexible sheet on the cushioned-backing material, and a solar cell on the flexible sheet, wherein the solar cell, flexible sheet, and cushioned-backing material each conform to the curved surface and are each flexible to cooperatively bend while joined together, to stably conform to different curved shapes of roof tiles or shingles, including curved shapes of S-shaped tiles and M-shaped tiles.

2. The roof member of claim 1, wherein the body comprises a roof tile.

3. The roof member of claim 1, wherein the roof tile is S-shaped or M-shaped.

4. The roof member of claim 1, wherein the body comprises a portion of a vent which comprises:
   a primary vent member having an opening allowing a ventilation airflow between regions below and above the primary vent member; and
   a secondary vent member forming at least a portion of the body, the secondary vent member having a curved surface, the secondary vent member being positioned above the primary vent member to prevent ingress of water through the opening while allowing said ventilation airflow to travel from the region below the primary vent member through the opening toward an airspace above the secondary vent member.

5. The roof member of claim 1, wherein the flexible sheet comprises a flexible stainless steel sheet.

6. The roof member of claim 1, wherein the flexible sheet and the solar cell are encapsulated in a polymer, and bonded to the cushioned backing material.

7. A roof member configured to form a portion of the top surface of a roof, the roof member made by a method comprising:
   providing a roof member body having a surface, wherein the body comprises a roof tile or shingle, the roof tile supported on one or more battens, the roof tile or shingle overlapping a portion of an adjacent roof tile or shingle;
   providing a flexible, form-fitting solar panel, wherein the solar panel comprises a cushioned-backing material, a flexible sheet on the cushioned-backing material, and a solar cell on the flexible sheet, wherein the solar cell, flexible sheet, and cushioned-backing material of the solar panel are each flexible to cooperatively bend while joined together, to stably conform to different curved shapes of roof tiles or shingles, including curved shapes of S-shaped tiles and M-shaped tiles; and
   securing the cushioned-backing material of the solar panel to the surface of the roof member body such that the solar panel substantially conforms to the surface.

8. The roof member of claim 7, wherein the surface is curved.

9. The roof member of claim 7, wherein the surface is flat.

10. The roof member of claim 7, wherein providing the solar panel comprises encapsulating the flexible sheet and the solar cell in a polymer, and bonding the flexible sheet and the solar cell to the cushioned backing material.

* * * * *